United States Patent [19]
Kai

[11] Patent Number: 4,661,972
[45] Date of Patent: Apr. 28, 1987

[54] MOBILE TELEPHONE SYSTEM FOR AUTOMATICALLY PAGING ABSENT MOBILE SUBSCRIBER

[75] Inventor: Tomokazu Kai, Tokyo, Japan

[73] Assignee: NEC Corporation, Japan

[21] Appl. No.: 830,511

[22] Filed: Feb. 14, 1986

[30] Foreign Application Priority Data

Feb. 18, 1985 [JP] Japan .................................. 60-29923
Apr. 26, 1985 [JP] Japan ............................ 60-62999[U]

[51] Int. Cl.⁴ ........................................ H04M 11/00
[52] U.S. Cl. ........................................ 379/57; 455/54; 379/56; 379/170; 340/825.44
[58] Field of Search .................... 455/33, 54, 38; 179/2 E, 2 EA, 2 EB, 2 EC, 18 B, 18 BE, 18 BF, 99 P; 340/825.44, 825.45, 825.48

[56] References Cited

U.S. PATENT DOCUMENTS

| | | | |
|---|---|---|---|
| 3,588,371 | 6/1971 | Dal Monte | 455/33 |
| 4,178,475 | 12/1979 | Taylor et al. | 179/2 EC |
| 4,178,476 | 12/1979 | Frost | 179/2 EC |
| 4,313,035 | 1/1982 | Jordan et al. | 179/18 BE |
| 4,336,524 | 6/1982 | Levine | 340/311.1 |
| 4,468,813 | 8/1984 | Burke et al. | 455/38 |
| 4,490,579 | 12/1984 | Godoshian | 179/2 EC |
| 4,577,060 | 3/1986 | Webb et al. | 179/2 EC |

OTHER PUBLICATIONS

"Mobile Unit for 800 MHz Band Land Mobile Telephone System", Review of the Electrical Communications Laboratories Vol. 25, Nos. 11-12, Nov.-Dec., 1977.
"Telephone Set for 800 MHz Band Land Mobile Telephone System", Review of the Nov.-Dec. 1977.

Primary Examiner—Robert G. Lev
Attorney, Agent, or Firm—Laff, Whitesel, Conte & Saret

[57] ABSTRACT

A mobile telephone unit belongs to a mobile telephone system with a mobile telephone system and a paging system which cover an identical service area, are independently operated, and are connected through an exchange. The mobile telephone unit includes a telephone set connected to a radio transmitter/receiver and an automatic pager calling circuit. The automatic pager calling circuit includes a circuit for detecting and storing that an incoming call is made for a mobile subscriber who carries a pager and is away from a vehicle, and a circuit for sending a signal representing a preset pager number to the radio transmitter/receiver. The pager number signal for the radio transmitter/receiver is automatically sent by the paging system to the pager through the exchange, thereby calling the mobile subscriber.

6 Claims, 11 Drawing Figures

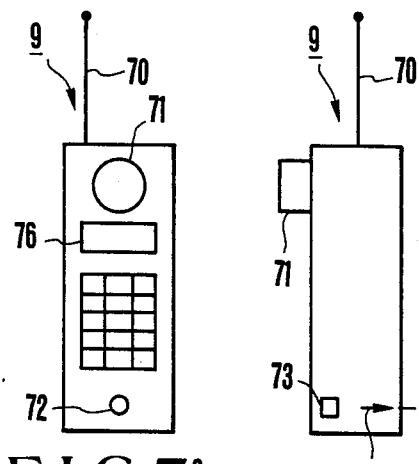
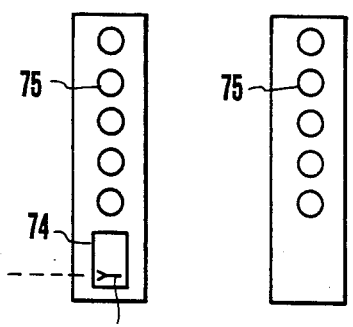
FIG.7A  FIG.7B  FIG.7C  FIG.7D
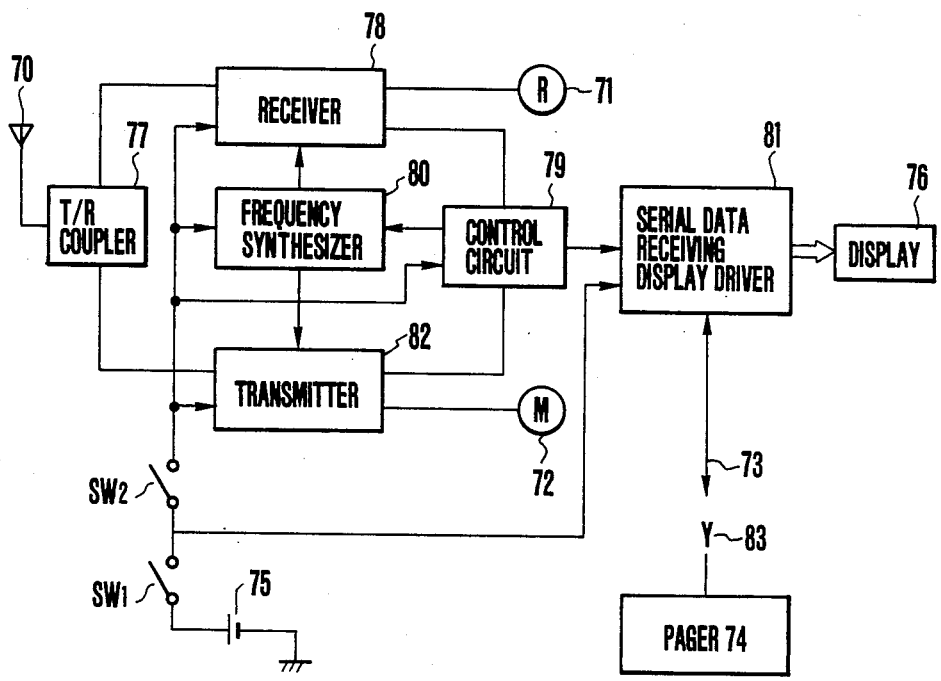
FIG.8

MOBILE TELEPHONE SYSTEM FOR AUTOMATICALLY PAGING ABSENT MOBILE SUBSCRIBER

BACKGROUND OF THE INVENTION

The present invention relates to a mobile telephone system for automatically paging a called mobile subscriber through a pager upon reception of an incoming call to the mobile subscriber while he is absent.

Mobile telephone systems have been commercially available for connecting a ordinary or stationary subscriber telephone set to a mobile telephone unit installed in a motor vehicle. A typical example of a conventional mobile telephone unit is described in "Mobile Unit for 800 MHz Band Land Mobile Telephone System", *Review of the Electrical Communication Laboratories*, Volume 25, Number 11-12, November-December, 1977. In the conventional mobile telephone unit, when an incoming call is made to a mobile subscriber using a mobile telephone set and he is in or near the vehicle, he can respond to an audible ringing sound from the telephone set. However, while he is away from the vehicle, he carries a pager. Upon reception of an incoming call, a paging system is automatically started by a mobile telephone exchange to call the pager of the mobile subscriber. In this case, the mobile subscriber is informed of the reception of an incoming call and is told the telephone number of the calling stationary subscriber.

In order to automatically start the paging system, hardware such as a memory associated with a rerouting request for the pager, a dial pulse sending circuit for sending the pager number of a called party, and a DTMF oscillator must be mounted in a mobile telephone exchange. Alternatively, software can be changed. For this purpose, the existing mobile telephone exchange must be modified. In addition, although the calling stationary subscriber can call the pager, cumbersome operations are needed.

SUMMARY OF THE INVENTION

It is an object of the present invention to provide a mobile telephone system wherein an incoming call to a mobile telephone set is automatically acknowledged to a mobile subscriber who is away from a vehicle, without modifying the existing mobile telephone system or paging system.

In order to achieve the above object of the present invention, there is provided a mobile telephone system for automatically calling an absent mobile subscriber, comprising an exchange connected to a plurality of stationary subscriber telephone sets; a mobile telephone base station connected to the exchange; a mobile telephone unit installed in a vehicle and connected by a radio channel to the mobile telephone base station; a pager base station connected to the exchange; and a pager to be paged by the pager base station, wherein the mobile telephone unit includes a radio transmitter/receiver, a telephone set connected to the radio transmitter/receiver, and automatic pager calling means, and the automatic pager calling means includes call detecting means, for detecting an incoming call from a calling subscriber while the mobile subscriber is away from the vehicle and storing the information indicating that the mobile subscriber is away from the vehicle, and pager number supplying means, for automatically supplying to the radio transmitter/receiver, a signal representing a pager number in response to a signal from the call detecting means. The pager number signal from the radio transmitter/receiver is supplied to the exchange through the mobile telephone base station and is discriminated by the exchange. The pager number signal is then automatically transferred to the pager base station. The pager base station calls the pager in accordance with the normal paging system operation.

BRIEF DESCRIPTION OF THE DRAWINGS

FIGS. 7A to 7D are schematic views showing a pager combined with a portable telephone set; and FIG. 8 is a block diagram for explaining the combination of the portable telephone set and the pager.

DETAILED DESCRIPTION OF THE PREFERRED EMBODIMENTS

Preferred embodiments of the present invention will be described with reference to the accompanying drawings.

Figure 1:
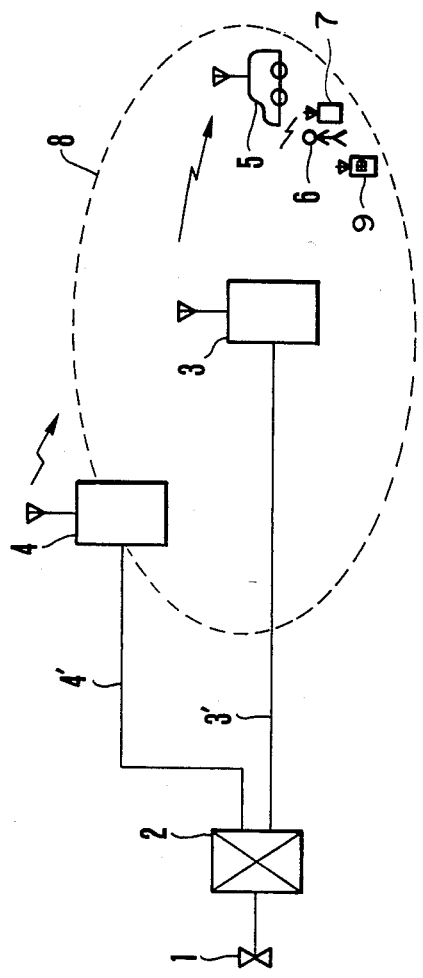
FIG. 1 is a schematic diagram showing the overall system configuration of a mobile telephone system according to the present invention.

FIG. 1 is a schematic diagram of a total system which employs a mobile telephone apparatus for calling an absent mobile subscriber according to the present invention.

Referring to FIG. 1, a stationary subscriber telephone set 1 is connected to a mobile telephone exchange (to be referred to as an exchange hereinafter) 2. The exchange 2 is connected to a mobile telephone base station 3 and a pager base station 4 through lines 3' and 4', respectively. The mobile telephone base station 3 and the pager base station 4 cover a service area 8 and belong to the mobile telephone and paging systems which are independently utilized. The exchange 2 can connect the the stationary subscriber 1 to the line 3' or 4' and connects the lines 3' and 4'. The mobile telephone base station 3 is connected to a mobile telephone unit 5 by a radio carrier wave or channel. The pager base station 4 is connected to a pager 7 by the radio circuit. In the mobile telephone system, the procedures for causing the stationary subscriber 1 to call a mobile subscriber 6 (he is away from the vehicle in FIG. 1) using the mobile telephone unit 5 are as follows.

When the stationary subscriber (1) dials the telephone number of the mobile telephone unit 5 of the mobile subscriber 6, the telephone number is discriminated by the exchange 2 to activate the mobile telephone base station 3 in the service area 8. The mobile telephone base station 3 transmits the telephone number over a radio channel to operate the ringer in the mobile telephone unit 5 of the called mobile subscriber 6. In this case, when the mobile subscriber 6 is in the vehicle, he picks up the handset of the telephone set and can communicate immediately with the stationary subscriber (1). When one of the mobile and stationary subscribers hangs up, the on-hook state is established. The exchange 2 is disengaged from the mobile telephone base station 3, and the mobile telephone base station 3 is also disengaged from the mobile telephone unit 5.

While the mobile subscriber 6 is away from the vehicle, however, he cannot hear the audible ringer sound and cannot communicate with the stationary subscriber by answering the phone.

In this state, the pager base station 4 can be connected to the mobile telephone base station 3 through the exchange 2. If the mobile subscriber 6 carries the pager 7 and is away from the mobile telephone unit 5, the mobile subscriber 6 can be reached by the pager base station 4 through the pager 7. According to the present invention, the stationary subscriber 1 can communicate with the mobile subscriber 6 even if the mobile subscriber is away from the vehicle without modifying the mobile telephone system or paging system.

Figure 2:
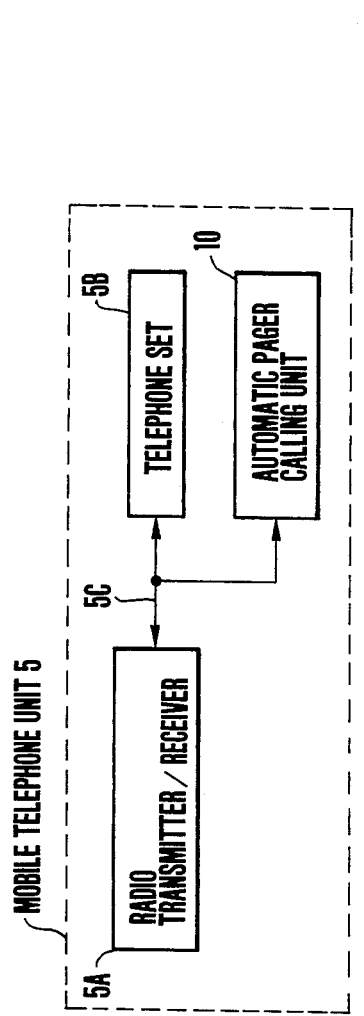
FIG. 2 is a block diagram of a mobile telephone unit in the system shown in FIG. 1.

FIG. 2 shows the basic arrangement of the mobile telephone unit 5 according to the present invention. A radio transmitter/receiver 5A is connected to a telephone set 5B through a line 5C in the same manner as in a conventional unit. An automatic pager calling circuit 10 is also connected to the radio transmitter/receiver 5A. The automatic pager calling circuit 10 detects whether the mobile subscriber 6 is away from the vehicle. When an incoming call is made to the mobile subscriber 6 while he is away from the vehicle, the automatic pager calling circuit 10 detects this and stores the incoming call. Upon reception of an incoming call while the mobile subscriber 6 is away from the vehicle, the corresponding pager number is sent to the radio transmitter/receiver 5A. In addition, the automatic pager calling circuit 10 acknowledges to the calling stationary subscriber (1) that the called mobile subscriber 6 is away from the vehicle through the mobile telephone unit 5, mobile telephone base station 3 and the exchange 2. The automatic pager calling circuit 10 preferably suggests the calling stationary subscriber (1) to leave a message, which is then transferred to the called mobile subscriber 6 through the same path described above.

Figure 3:
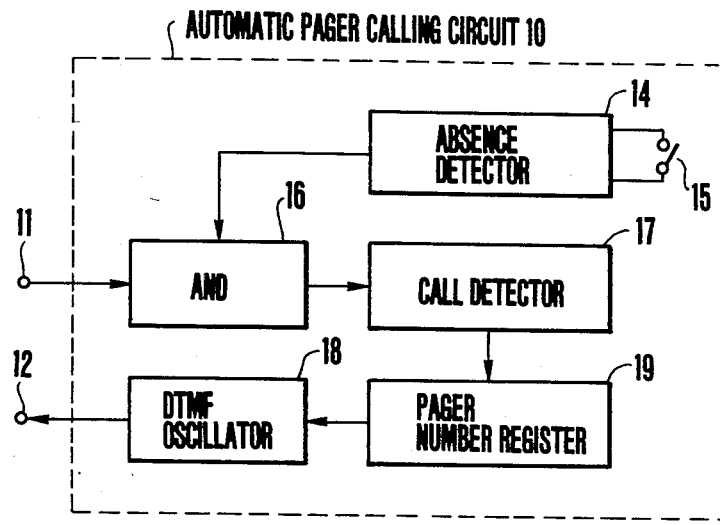
FIG. 3 is a block diagram of an automatic pager calling circuit in FIG. 2 according to an embodiment of the present invention.

FIG. 3 is a block diagram of the automatic pager calling circuit 10 in FIG. 2 according to an embodiment of the present invention. An absence detector 14 is connected to a switch 15. When the mobile subscriber 6 is away from the vehicle and wish to be acknowledged an incoming signal by the pager 7, he manually operates the switch 15, causing that the absence detector 14 is activated by the switch 15 to supply an absence signal to an AND gate 16. In this state, when a ringing tone or signal representing an incoming call is supplied to a terminal 11, the ringing signal is supplied through the AND gate 16 to a call detector 17. The call detector 17 detects the ringing tone and stores it in own memory. When the call is completed, the call detector 17 supplies an on-hook signal to a pager number register 19. A pager number of the pager 7 is preset in the pager number register 19. The pager number register 19 automatically supplies the pager number signal to a DTMF (Dual Tone Multi Frequency) oscillator 18 in response to the on-hook signal. The DTMF oscillator 18 supplies a transmission signal representing the pager number to an output terminal 12.

Figure 4:
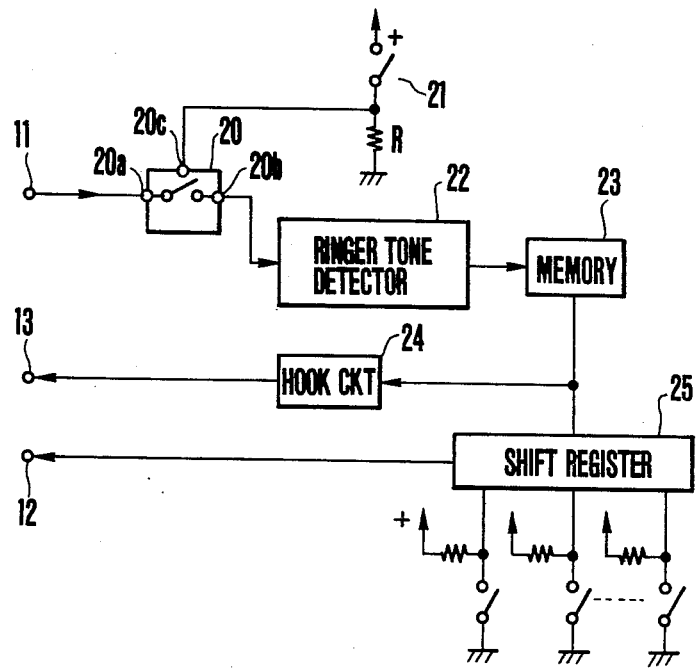
FIG. 4 is a block diagram of an automatic pager calling circuit according to another embodiment of the present invention.

FIG. 4 is a block diagram of an automatic pager calling circuit according to another embodiment of the present invention. Terminals 11, 12 and 13 are respectively connected to audio, dial signal and hook lines for connecting the radio transmitter/receiver 5A and the telephone set 5B in FIG. 2. A terminal 11 is connected to a terminal 20a of an analog switch 20. A terminal 20b of the analog switch 20 is connected to the input terminal of a ringer tone detector 22. The analog switch 20 is turned on/off in response to a voltage applied to its control terminal 20c. The control terminal 20c is connected to one terminal of an absence switch 21. This terminal is grounded through a resistor R. A positive voltage is applied to the other terminal of the absence switch 21. The ringer tone detector 22 comprises a band-pass filter. The output terminal of the ringer tone detector 22 is connected to the data input terminal of a memory 23. The data output terminal of the memory 23 is connected to the input terminals of a hook circuit 24 and a shift register 25. The output terminal of the hook circuit 24 is connected to a hook line terminal 13. A shift register 25 corresponds to the pager number register 19 in FIG. 3 and prestores the pager number. The shift register 25 supplies a serial signal to the terminal 12 in response to a control signal from the memory 23. The operation of the circuit in FIG. 4 is performed as follows. When the mobile subscriber 6 closes the switch 15, a positive voltage is applied to the control terminal 20c of the analog switch 20, so that the analog switch 20 is turned on. Upon reception of a ringer tone via an audio signal line, the ringer tone detector 22 detects the ringer tone and causes the memory 23 to store data representing that the ringer rings.

When the ringer tone is stopped, the hook circuit 24 supplies an off-hook signal to the hook line through the terminal 13. At the same time, the pager number data prestored in the shift register 25 is sent onto the dial signal line through the terminal 12. The pager number signal appearing on the dial tone line is sent to the pager 7. When all data from the shift register 25 is completely sent, a ring-back tone is sent back from the pager base station 4 to the mobile telephone unit 5 through the exchange 2 and the mobile base station 3. The ring-back tone is received by the ringer tone detector 22 in the automatic pager calling circuit 10 in the same manner as the ringer tone. In response to the ring-back tone, the ringer tone detector 22 disables the memory 23, sets the hook circuit 24 in the on-hook state, and stops calling the pager 7.

Figure 5:
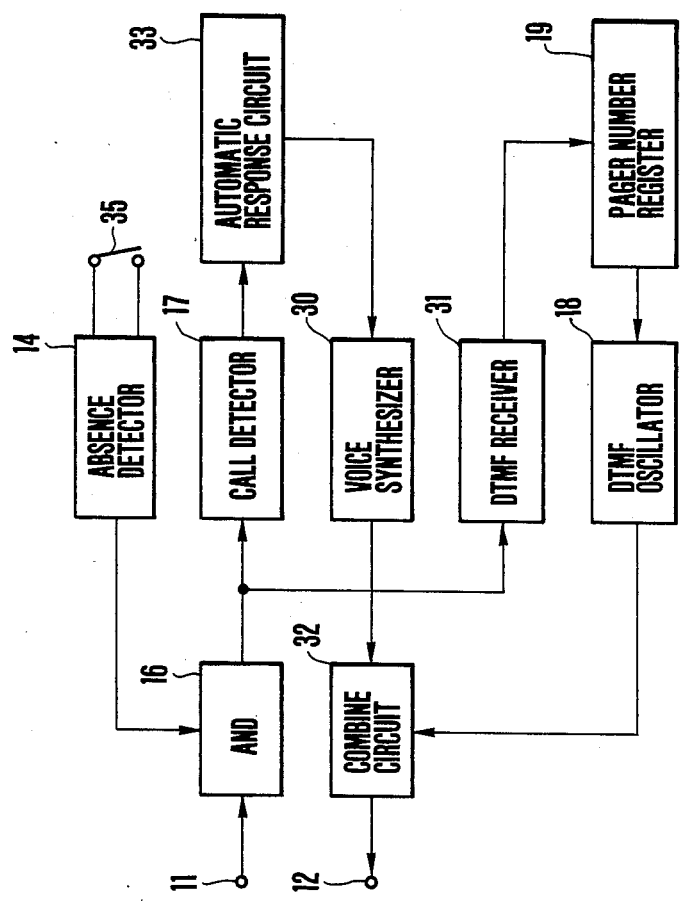
FIG. 5 is a block diagram of an automatic pager calling circuit according to still another embodiment of the present invention.

FIG. 5 is a block diagram of an automatic pager calling circuit according to still another embodiment of the present invention.

Referring to FIG. 5, when the mobile subscriber 6 is away from the vehicle and calling by the pager 7 is required, an absence switch 35 is closed. When the absence switch 35 is closed and the incoming call is received, the ringing signal is supplied to a call detector 17. An automatic response circuit 33 is activated by the call detector 17 and held in the off-hook state. Subsequently, a voice synthesizer 30 is activated to send the message: "He is away from the vehicle. Please call him using the paging system. Send your dial number." In response to this message, the number of the calling stationary subscriber is sent as a DTMF signal, and this signal is received by a DTMF receiver 31, so that the dial number of the calling stationary subscriber is stored. When the dial number of the calling stationary subscriber has been received, the telephone channel between the stationary subscriber telephone set 1 and the mobile telephone unit 5 is held in the on-hook state. Subsequently, the pager number is automatically dialed to call the pager of the called mobile subscriber. Subsequently the pager number is sent to the pager and is checked by the called mobile subscriber.

Figure 6:
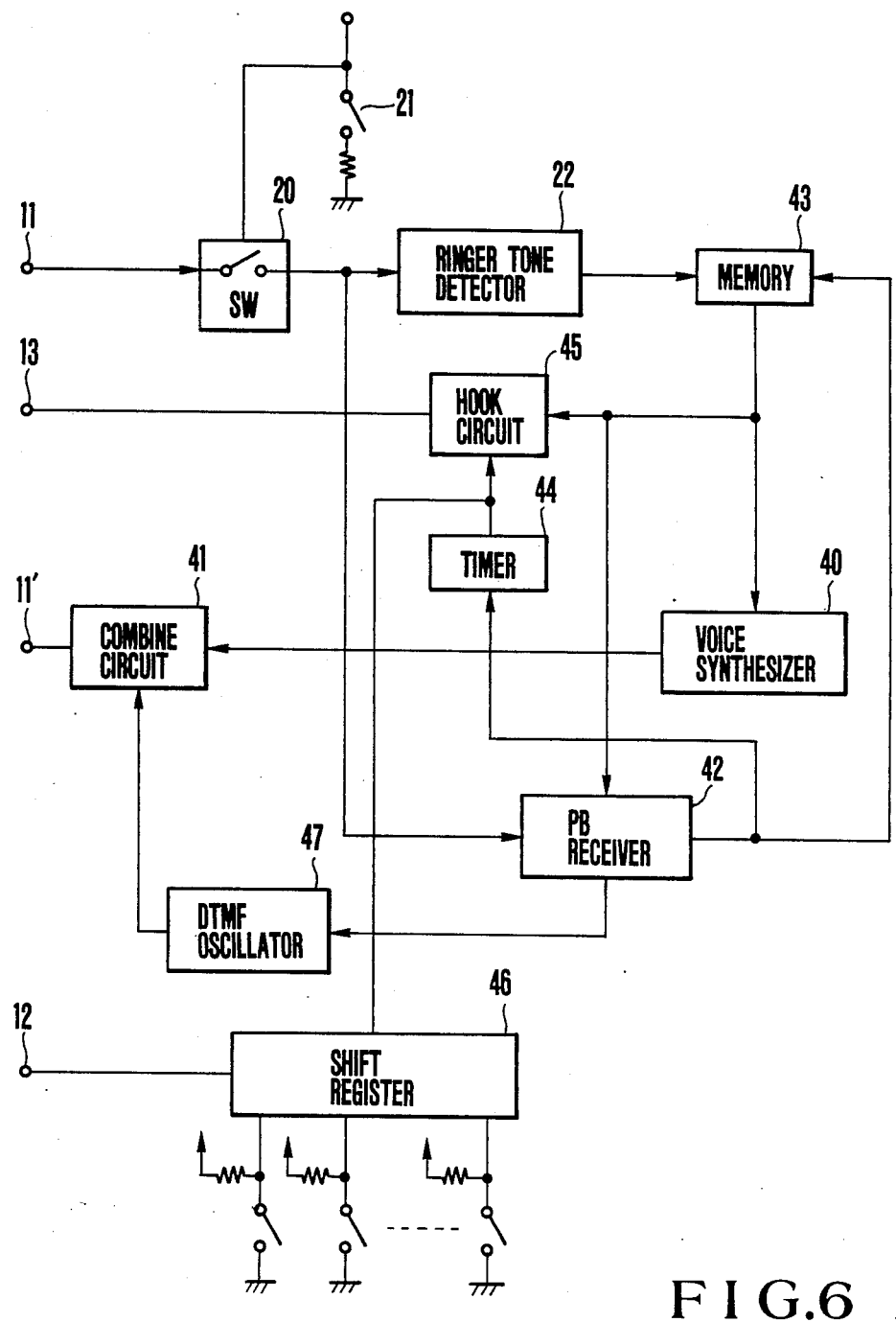
FIG. 6 is a block diagram of an automatic pager calling circuit according to still another embodiment of the present invention.

FIG. 6 is a block diagram of an automatic pager calling circuit according to still another embodiment of the present invention. When a ringer tone is supplied to a terminal 11, the circuit is held in the off-hook state in the same manner as in the previous embodiments. A message similar to that described above is sent from a voice synthesizer 40 onto an audio line through a combine circuit 41 and a terminal 11'. The calling subscriber sends a message, for example his telephone number, by a pushbutton (PB).

Detection of the pushbutton tone sent from the stationary subscriber 1 to the terminal 11 via the audio line is started by a PB receiver 42. When the pushbutton tone from the stationary subscriber 1 is received by the PB receiver 42, this tone is stored in a memory in the PB receiver 42. When reception of the pushbutton tone is completed, a memory 43 is reset, and a timer 44 is started. At the same time, a hook circuit 45 is held in the on-hook state. A predetermined period of time is preset in the timer 44. When the predetermined period of time has elapsed, the hook circuit 45 is held in the off-hook state again in response to a signal from the timer 44. At the same time, a pager number preset in a shift register 46 is sent onto a dial signal line through a terminal 12. When a ring-back tone sent back from the pager base station 4 is detected, the message of the stationary subscriber 1 which is stored in the PB receiver 42 is sent onto the audio line through the combine circuit 41 and the terminal 11'.

A tone generator of a predetermined tone frequency may be used in place of the voice synthesizers 30 and 40 in the above embodiments to obtain the same effects as in these embodiments.

A voice memory for receiving and storing a voice signal may be used in place of the DTMF receiver 31 to send the voice signal to the pager 7 within the spirit and scope of the present invention.

It is also possible to use a means for detecting the ON time of the ringer in place of the absence switch.

When the mobile subscriber 6 carries the pager 7 and a portable telephone set 9 (FIG. 1) to be used as a mobile terminal, more convenience can be provided. FIGS. 7A to 7D show a portable telephone set with a detachable pager 74. FIGS. 7A and 7B are a front view and a side view, respectively, of a portable telephone housing. Reference numeral 70 denotes an antenna; 71, an ear piece; 72, a mouth piece; 73, a serial signal connector; and 76, a display. FIG. 7C shows a battery pack with a pager 74, and FIG. 7D shows a battery pack without the pager 74. Referring to FIGS. 7C and 7D, reference numeral 75 denotes a battery; 74, a pager; and 83, a serial signal connector to be connected to the connector 73. Since the pager 74 is built into the battery pack, it is not necessary to provide the pager 74 as a component of the portable telephone set. In other words, a mobile subscriber who wants the pager can carry the battery pack (FIG. 7C) with the pager 74, but a mobile subscriber who does not want the pager can carry the battery pack (FIG. 7D) without the pager 74. The pager 74 is detachably mounted in the battery pack in FIG. 7C, so that two types of battery packs need not be prepared.

FIG. 8 is a block diagram of the portable telephone set. When a mobile subscriber wishes to make an outgoing call or receives an incoming call, switches SW1 and SW2 are kept ON, and the portable telephone set is normally operated.

Upon reception of a wave at the antenna 70 in the standby mode, the wave is branched by a Transmitter/Receiver (T/R) coupler 77 and is supplied to a receiver 78. The receiver 78 demodulates the received wave. A demodulated signal is decoded by a control circuit 79 to determine whether the call has been made to the proper mobile subscriber. A frequency synthesizer 80 supplies a local frequency signal under control of the control circuit 79. When the portable telephone set monitors an incoming call of its own, the receiver 78, the frequency synthesizer 80 and the control circuit 79 are operated using the power of the battery 75 in the battery pack.

In a low power consumption mode wherein the switch SW2 is turned off and the circuits 78, 79 and 80 are deenergized, only a serial data receiving/display driver 81 and the pager 74 are energized via the switch SW1. Therefore, current consumption in the standby mode can be decreased by 40 to 50 mA.

When the pager 74 is detachably mounted in the battery pack, the serial signal connectors 73 and 83 are connected to each other.

The pager 74 receives the telephone number of the calling subscriber and supplies it to the serial data receiving/display driver 81 through the connectors 83 and 73. Therefore, the telephone number is displayed on the display 76.

Current consumption is limited to the pager 74 and the serial data receiving/display driver 81, which together consume only 1 mA or less, thereby saving power. When the display content is the telephone number of the calling stationary subscriber, the called mobile subscriber turns on the switch SW2 again. The called mobile subscriber can dial the displayed telephone number and can then communicate with the stationary subscriber.

What is claimed is:

1. A mobile telephone system for automatically calling an absent mobile subscriber, comprising an exchange connected to a plurality of stationary subscriber telephone sets; a mobile telephone base station connected to said exchange; a mobile telephone unit installed in a vehicle and connected by a radio channel to said mobile telephone base station; a pager base station connected to said exchange; and a pager to be paged by said pager base station, wherein said mobile telephone unit includes a radio transmitter/receiver, a telephone set connected to said radio transmitter/receiver, and automatic pager calling means, and said automatic pager calling means includes call detecting means, for detecting an incoming call from a calling subscriber while the mobile subscriber is away form the vehicle and storing the information indicating that the mobile subscriber is away from the vehicle, and pager number supplying means, for automatically supplying said pager base station through said radio transmitter/receiver, said mobile telephone base station and said exchange, with a signal representing a pager number in response to a signal from said call detecting means.

2. A system according to claim 1, wherein said automatic pager calling means further includes: hook circuit means for setting said radio transmitter/receiver and said automatic pager calling means in an off-hook state in response to an output from said call detecting means;

means for sending a preset outgoing message to the calling stationary subscriber; means for detecting and storing an incoming message from the calling stationary subscriber; and means for sending the incoming message following the pager number.

3. A system according to claim 2, wherein said outgoing message sending means includes a voice synthesizer.

4. A system according to claim 2, wherein the incoming message is a pushbutton signal.

5. A system according to claim 1, wherein said pager is mounted in a battery pack which is detachable to a portable telephone set.

6. A system according to claim 5, wherein said portable telephone set includes a display for displaying an output from said pager.

* * * * *